(12) United States Patent
Xie et al.

(10) Patent No.: US 11,589,141 B2
(45) Date of Patent: Feb. 21, 2023

(54) DATA COLLECTION METHOD AND RELATED DEVICE

(71) Applicant: HUAWEI TECHNOLOGIES CO., LTD., Guangdong (CN)

(72) Inventors: Yuming Xie, Nanjing (CN); Jian Cheng, Nanjing (CN); Li Xue, Nanjing (CN); Teng Teng, Nanjing (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/326,652

(22) Filed: May 21, 2021

(65) Prior Publication Data

US 2021/0281935 A1 Sep. 9, 2021

Related U.S. Application Data

(63) Continuation of application No. PCT/CN2019/123706, filed on Dec. 6, 2019.

(30) Foreign Application Priority Data

Dec. 6, 2018 (CN) .......................... 201811492522.2

(51) Int. Cl.
*H04B 10/075* (2013.01)
*H04Q 11/00* (2006.01)
*H04L 12/54* (2022.01)
*H04L 12/70* (2013.01)

(52) U.S. Cl.
CPC ..... *H04Q 11/0067* (2013.01); *H04L 12/5601* (2013.01); *H04Q 11/0066* (2013.01); *H04L 2012/5625* (2013.01); *H04Q 2011/0064* (2013.01); *H04Q 2011/0083* (2013.01); *H04Q 2011/0084* (2013.01)

(58) Field of Classification Search
CPC ................................................... H04B 10/075
See application file for complete search history.

(56) References Cited

U.S. PATENT DOCUMENTS 10,826,780 B1 * 11/2020 Ivarson .............. H04B 10/0795
2009/0269053 A1 10/2009 Yang
2010/0214955 A1 * 8/2010 Rune ..................... H04W 48/10
370/254

(Continued)

FOREIGN PATENT DOCUMENTS

CN 101267644 A 9/2008
CN 104125013 A 10/2014
(Continued)

*Primary Examiner* — Shi K Li

(74) *Attorney, Agent, or Firm* — Womble Bond Dickinson (US) LLP

(57) ABSTRACT

In an embodiment, a data collection method includes: collecting, by a data collection device, performance indicator data of a target device based on a collection periodicity; detecting change amplitude of the collected performance indicator data that is in a change detection window, where the change detection window includes multiple collection periodicities; and when it is detected that change amplitude of the performance indicator data that is in the change detection window is greater than or equal to a change detection threshold, sending the performance indicator data that is in the change detection window to a data analysis device.

16 Claims, 5 Drawing Sheets

(56) References Cited

U.S. PATENT DOCUMENTS

| | | | |
|---|---|---|---|
| 2012/0116724 A1 | 5/2012 | Takara et al. | |
| 2012/0251100 A1 | 10/2012 | Rope | |
| 2015/0271793 A1* | 9/2015 | Fischer | H04B 10/25752 |
| | | | 455/562.1 |
| 2016/0378132 A1 | 12/2016 | Daghighian et al. | |
| 2017/0366266 A1 | 12/2017 | Coli et al. | |
| 2020/0201292 A1* | 6/2020 | Cella | G05B 19/418 |
| 2021/0058154 A1* | 2/2021 | Musumeci | H04B 10/0795 |
| 2021/0067167 A1* | 3/2021 | Sato | G11B 20/10 |
| 2021/0345205 A1* | 11/2021 | Persson | H04W 36/0011 |

FOREIGN PATENT DOCUMENTS

| | | |
|---|---|---|
| CN | 105278353 A | 1/2016 |
| CN | 105682121 A | 6/2016 |
| CN | 106535253 A | 3/2017 |
| CN | 107276779 A | 10/2017 |

\* cited by examiner

DATA COLLECTION METHOD AND RELATED DEVICE

CROSS-REFERENCE TO RELATED APPLICATIONS

This application is a continuation of International Application No. PCT/CN2019/123706, filed on Dec. 6, 2019, which claims priority to Chinese Patent Application No. 201811492522.2, filed on Dec. 6, 2018. The disclosures of the aforementioned applications are hereby incorporated by reference in their entireties.

TECHNICAL FIELD

This application relates to the field of communications technologies, and in particular, to a data collection method and a related device.

BACKGROUND

With the rapid development and innovation of internet technologies, big data analysis plays an increasingly important role in various fields, and big data collection is a particularly important operation in big data analysis. Currently, in network operation and maintenance, for example, in a passive optical network (PON), a quantity of optical network units (ONU) has reached millions or even tens of millions. How to collect highly precise and valid data from massive ONU devices becomes a key point.

A PON network system mainly includes an optical line terminal (OLT), an optical distribution network (ODN) including a passive optical device, and an ONU or an optical network terminal (ONT) at a user end, and generally uses a point-to-multipoint tree topology structure. As shown in FIG. 1, multiple OLT devices are connected to multiple ONU devices or ONT devices through one or more levels of optical splitter, to jointly form a PON network.

In current home broadband troubleshooting, the ONU device generally periodically collects data and uploads the data to the OLT device, and then reports the data to an analyzer. If a data collection and reporting periodicity is too short, for example, 1 second, an amount of data to be reported may be very large. This poses high requirements on storage performance and transmission channels of the analyzer, and the requirements are difficult to meet. If the data collection and reporting periodicity is too long, for example, 15 minutes, one hour, or one day, abundant data cannot be collected for analysis, an ODN logical topology cannot be restored, and emergency faults cannot be located.

SUMMARY

This application provides a data collection method and a related device. Performance indicator data of a target device is collected; change amplitude of the collected performance indicator data that is in a change detection window is detected; and when it is detected that the change amplitude of the data that is in the change detection window is greater than or equal to a change detection threshold, the performance indicator data that is in the change detection window is sent to a data analysis device, so that finer-grained performance indicator data can be collected, performance indicator data with a sudden change can be collected, a change feature of the sudden change can be discovered, data analysis accuracy can be ensured, and an amount of data to be reported can be reduced.

According to a first aspect, a data collection method is provided. The method includes: A data collection device collects performance indicator data of a target device based on a collection periodicity. The data collection device detects change amplitude of the collected performance indicator data that is in a change detection window, where the change detection window includes multiple collection periodicities. When the data collection device detects that the change amplitude of the performance indicator data that is in the change detection window is greater than or equal to a change detection threshold, the data collection device sends the performance indicator data that is in the change detection window to a data analysis device.

In the solutions provided in this application, the data collection device detects the collected performance indicator data that is in the change detection window. When the change amplitude of the performance indicator data that is in the change detection window is greater than or equal to the change detection threshold, the performance indicator data that is in the change detection window is reported to the data analysis device. In this way, finer-grained performance indicator data can be collected, performance indicator data with a sudden change can be effectively collected, a change feature of the sudden change can be discovered, data analysis accuracy can be ensured, and an amount of the performance indicator data to be reported can be reduced.

In an embodiment, before the data collection device collects the performance indicator data based on the collection periodicity, the method further includes: The data collection device receives a first configuration message sent by the data analysis device, where the first configuration message includes duration of the change detection window and/or the change detection threshold.

In the solutions provided in this application, the data collection device may detect the change amplitude of the performance indicator data based on the change detection parameter value configured and delivered by the data analysis device, to ensure that the detected and reported data meets a requirement of the data analysis device, so that the data analysis device can perform accurate analysis based on the received performance indicator data.

In an embodiment, the performance indicator data is one of transmit optical power, receive optical power, a bias current, a voltage, and a temperature.

In an embodiment, before the data collection device receives the first configuration message sent by the data analysis device, the method further includes: The data collection device sends collection capability information to the data analysis device, where the collection capability information of the collection device includes a performance indicator corresponding to the performance indicator data, and a collection periodicity and collection precision of the performance indicator.

In the solutions provided in this application, the data collection device reports the collection capability information to the data analysis device, and negotiates with the data analysis device. In this way, the data analysis device can perceive a collection capability of the data collection device and configure a collection parameter value for the data collection device, to ensure that the data collection device can collect and report key performance indicator data as required.

In an embodiment, the method further includes: The data collection device sends data processing capability information of the collection device to the data analysis device, where the data processing capability information includes a sequence compression algorithm, and the sequence compression algorithm is used to compress the performance indicator data sent to the data analysis device.

In the solutions provided in this application, the data collection device may further negotiate with the data analysis device on a data processing capability. In this way, the data collection device may further perform data processing after collecting the key performance indicator data. In addition, the data collection device compresses the performance indicator data by using the sequence compression algorithm. Therefore, the amount of the data to be reported can be further reduced, transmission pressure of a transmission channel can be reduced, data transmission efficiency can be improved, and bandwidth utilization can be improved.

In an embodiment, a difference between a maximum value and a minimum value of the key performance indicator data that is in the change detection window may be used to indicate change amplitude of the key performance indicator data that is in the change detection window. Correspondingly, that the data collection device detects change amplitude of the collected performance indicator data that is in a change detection window includes: The data collection device detects a value relationship between the change detection threshold and the difference between the maximum value and the minimum value of the collected key performance indicator data that is in the change detection window.

In an embodiment, an average deviation or a standard deviation of the key performance indicator data that is in the change detection window may alternatively be used to indicate the change amplitude of the performance indicator data that is in the change detection window. Correspondingly, the data collection device may alternatively detect a value relationship between the change detection threshold and the average deviation or the standard deviation of the collected key performance indicator data that is in the change detection window.

In the solutions provided in this application, the data collection device performs comparison detection on the change detection threshold and values that are used to indicate the change amplitude, for example, the average deviation, the standard deviation, and the difference between the maximum value and the minimum value of the key performance indicator data that is in the change detection window. In this way, whether the key performance indicator data that is in the change detection window has a sudden change can be accurately and quickly detected, so that detection efficiency is improved.

In an embodiment, that the data collection device sends the performance indicator data that is in the change detection window to a data analysis device includes: The data collection device removes sent performance indicator data that is in the change detection window, and sends remaining performance indicator data that is in the change detection window to the data analysis device.

In the solutions provided in this application, the data collection device removes the reported key performance indicator data that is in the change detection window, and reports the unreported key performance indicator data that is in the change detection window. In this way, the amount of the data to be reported by the data collection device can be further reduced, and storage pressure of the data analysis device and the transmission pressure of the transmission channel can be effectively reduced.

In an embodiment, the method further includes: The data collection device sends, to the data analysis device based on a data reporting periodicity, the performance indicator data collected at an end moment of each data reporting period-icity, where the duration of the change detection window is less than duration of the data reporting periodicity.

In the solutions provided in this application, the data collection device may need to periodically report, to the data analysis device, the key performance indicator data collected by the data collection device at the end moment of each data reporting periodicity, so that the data analysis device can perform data analysis with reference to the key performance indicator data periodically reported by the data collection device and the key performance indicator data of a sudden change. This further improves the data analysis accuracy.

According to a second aspect, a data collection method is provided. The method includes: A data analysis device sends a first configuration message to a data collection device, where the first configuration message includes duration of a change detection window and a change detection threshold, the duration of the change detection window and the change detection threshold are used by the data collection device to detect a value relationship between the change detection threshold and change amplitude of performance indicator data of a target device in the change detection window.

The data analysis device receives performance indicator data that is sent by the data collection device, that is in the change detection window, and that exceeds the change detection threshold.

In the solutions provided in this application, the data analysis device receives the performance indicator data that is detected by the data collection device, that is in the change detection window, and whose change amplitude is greater than or equal to the change detection threshold. This ensures that the performance indicator data that is sent by the data collection device and that has a sudden change can be effectively received, a change feature of the sudden change can be discovered, data analysis accuracy can be ensured, an amount of the performance indicator data to be received can be reduced, and storage pressure can be reduced.

In an embodiment, the performance indicator data is one of transmit optical power, receive optical power, a bias current, a voltage, and a temperature.

In an embodiment, the data analysis device determines the duration of the change detection window based on a performance indicator corresponding to the performance indicator data and a collection periodicity of the performance indicator; and/or the data analysis device determines the change detection threshold based on the performance indicator corresponding to the performance indicator data and collection precision of the performance indicator.

In an embodiment, before the data analysis device sends the first configuration message to the data collection device, the method further includes: The data analysis device receives collection capability information sent by the data collection device, where the collection capability information includes the performance indicator corresponding to the performance indicator data, and the collection periodicity and the collection precision of the performance indicator.

In an embodiment, the method further includes: The data analysis device receives data processing capability information sent by the data collection device, where the data processing capability information includes a sequence compression algorithm, and the sequence compression algorithm is used by the data collection device to compress the sent performance indicator data.

According to a third aspect, a data collection device is provided. The data collection device may be an optical network unit or an optical line terminal, or may be a chip in an optical network unit or an optical line terminal. The data collection device has a function of the data collection device in the first aspect. The function may be implemented by hardware, or may be implemented by hardware executing corresponding software. The hardware or software includes one or more units corresponding to the foregoing function.

In an embodiment, the data collection device includes a processing module and a transceiver module. For example, the processing module may be a processor, and the transceiver module may be a transceiver. The transceiver module is configured to support communication between the data collection device and a user terminal and communication between the data collection device and a data analysis device. In an example, the transceiver module may further include a sending module and a receiving module, and may be configured to support the data collection device in performing uplink communication and downlink communication. For example, the sending module may be configured to send collection capability information or data processing capability information to the data analysis device; the receiving module may be configured to receive a first configuration message from the data analysis device; and the processing module may be configured to: collect and detect performance indicator data based on the first configuration message, and when it is detected that change amplitude of the performance indicator data that is in a change detection window is greater than or equal to a change detection threshold, control the sending module to send the performance indicator data that is in the change detection window to the data analysis device. In an embodiment, the data collection device may further include a memory. The memory is configured to couple to the processor, and store program instructions and data that are used for the data collection device.

In an embodiment, the data collection device includes a processor and a transceiver. The processor is configured to control functions of each component, and the transceiver is configured to support communication between the data collection device and a user terminal and communication between the data collection device and a data analysis device. For example, in downlink communication, the transceiver of the data collection device may receive a collection capability request message or a data processing capability request message sent by the data analysis device, and perform decapsulation based on a protocol and perform decoding, to obtain the collection capability request message or the data processing capability request message. In an embodiment, the data collection device further includes a memory, and the memory stores program instructions and data that are used for the data collection device. For example, in uplink communication, the transceiver of the data collection device may send, to the data analysis device, a response message that carries collection capability information or data processing capability information.

In an embodiment, when the data collection device is a chip in an optical network unit or an optical line terminal, the chip includes a processing module and a transceiver module. For example, the processing module may be a processor, the processor may be configured to process a data packet that carries a first configuration message and that is received by the transceiver module, and the transceiver module may be an input/output interface on the chip. The processing module may execute a computer-executable instruction stored in a storage unit, to support the data collection device in performing a corresponding function in the first aspect. In an embodiment, the storage unit may be a storage unit in the chip, for example, a register or a buffer. Alternatively, the storage unit may be a storage unit that is in the data collection device and that is located outside the chip, for example, a read-only memory (ROM) or another type of static storage device that can store static information and instructions, or a random access memory (RAM).

In an embodiment, the data collection device includes a processor. The processor is configured to: couple to a memory, read an instruction in a memory, and perform a function of the data collection device in the first aspect according to the instruction. The memory may be located inside the processor, or may be located outside the processor.

According to a fourth aspect, a data analysis device is provided. The data analysis device may be a distributed cluster server, or may be a chip in a distributed cluster server. The data analysis device has a function of implementing the data analysis device in the second aspect. The function may be implemented by hardware, or may be implemented by hardware executing corresponding software. The hardware or software includes one or more units corresponding to the foregoing function.

In an embodiment, the data analysis device includes a processing module and a transceiver module. For example, the processing module may be a processor, and the transceiver module may be a transceiver. The transceiver module is configured to support communication between the data analysis device and a core network device and communication between the data analysis device and a data collection device. In an example, the transceiver module may further include a sending module and a receiving module, and may be configured to support the data analysis device in performing uplink communication and downlink communication. For example, the sending module may be configured to send a collection capability request message or a data processing capability request message to the data collection device; the receiving module may be configured to receive collection capability information or data processing capability information from the data collection device; and the processing module may be configured to: generate a first configuration message based on the collection capability information or the data processing capability information, and store and analyze performance indicator data that is collected and reported by the data collection device based on a detection parameter value configured in the first configuration message. In an embodiment, the data analysis device may further include a memory. The memory is configured to couple to the processor, and store program instructions and data that are used for the data analysis device.

In an embodiment, the data analysis device includes a processor and a transceiver. The processor is configured to control functions of each component, and the transceiver is configured to support communication between the data analysis device and a core network device and communication between the data analysis device and a data collection device. For example, in uplink communication, the transceiver of the data analysis device may receive collection capability information or data processing capability information sent by the data collection device, and perform decapsulation based on a protocol and perform decoding, to obtain the collection capability information or the data processing capability information. In an embodiment, the data analysis device further includes a memory, and the memory stores program instructions and data that are used for the data analysis device. For example, in downlink communication, the transceiver of the data analysis device may send, to the data collection device, a first configuration message that carries a detection parameter value.

In an embodiment, when the data analysis device is a chip in a distributed cluster server, the chip includes a processing module and a transceiver module. For example, the processing module may be a processor, the processor may be configured to process a data packet that carries collection capability information or data processing capability information and that is received by the transceiver module, and the transceiver module may be an input/output interface on the chip. The processing module may execute a computer-executable instruction stored in a storage unit, to support the data analysis device in performing a corresponding function in the second aspect. In an embodiment, the storage unit may be a storage unit in the chip, for example, a register or a buffer. Alternatively, the storage unit may be a storage unit that is in the data analysis device and that is located outside the chip, for example, a read-only memory (ROM) or another type of static storage device that can store static information and instructions, or a random access memory (RAM).

In an embodiment, the data analysis device includes a processor. The processor is configured to: couple to a memory, read an instruction in a memory, and perform a function of the data analysis device in the second aspect according to the instruction. The memory may be located inside the processor, or may be located outside the processor.

According to a fifth aspect, a computer non-transient storage medium is provided. The computer non-transient storage medium includes an instruction. When the instruction is run on a data collection device, the data collection device is enabled to perform the method according to any one of the embodiments in the first aspect.

According to a sixth aspect, a computer non-transient storage medium is provided. The computer non-transient storage medium includes an instruction. When the instruction is run on a data analysis device, the data analysis device is enabled to perform the method according to any one of the embodiments in the second aspect.

According to a seventh aspect, a communications system is provided. The communications system includes a data collection device and a data analysis device, where the data collection device and the data analysis device may communicate with each other;

the collection device is configured to perform the method according to any one of the embodiments in the first aspect; and the data analysis device is configured to perform the method according to any one of the embodiments in the second aspect.

DESCRIPTION OF EMBODIMENTS

Figure 1:
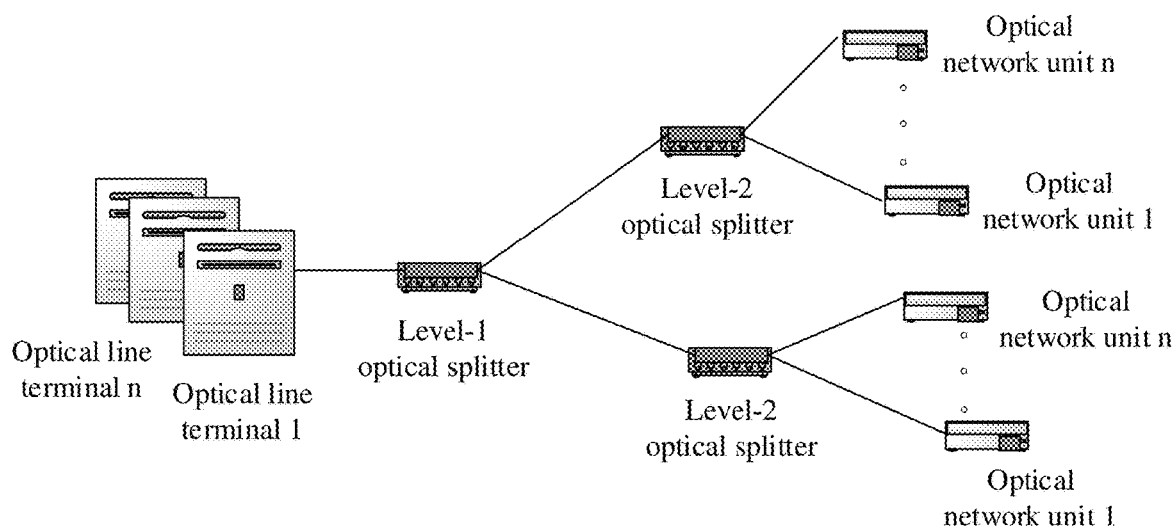
FIG. 1 is a schematic diagram of a system of a passive optical network according to an embodiment of this application.

The following describes the technical solutions in this application with reference to the accompanying drawings.

To implement big data analysis, big data needs to be collected first. For example, in a PON network, a data collection device such as an OLT collects performance indicator data of an ONU or an OLT through an optical network terminal management and control interface (OMCI), including collecting data such as transmit optical power, receive optical power, a bias current, a voltage, or a temperature of the ONU or the OLT. However, the OLT usually collects the data of the ONU or the ONT through the OMCI at a collection periodicity of one hour or one day. The shortest collection periodicity is 15 minutes. In other words, the OLT can collect the data of the ONU or the ONT once every 15 minutes.

Currently, the data is collected at a collection periodicity of 15 minutes. The collection periodicity is relatively long. Consequently, abundant data cannot be collected for effective analysis, that is, a change feature of a sudden change cannot be discovered. For example, the OLT may need to collect data of the receive optical power of the ONU and collect the data for the first time at the $15^{th}$ minute. However, the receive optical power of the ONU changes due to an optical path at the $20^{th}$ minute, in other words, the data of the receive optical power of the ONU also changes suddenly. However, at the $25^{th}$ minute, the receive optical power of the ONU is restored, in other words, the data of the receive optical power of the ONU is also restored. In this case, when the OLT collects the data of the receive optical power of the ONU for the second time at the $30^{th}$ minute, because the data of the receive optical power of the ONU is restored, the data of the receive optical power of the ONU collected at the second time is almost the same as the data of the receive optical power of the ONU collected at the first time. Consequently, a sudden change of the data of the receive optical power of the ONU between the $20^{th}$ minute and the $25^{th}$ minute cannot be discovered through the data of the receive optical power of the ONU collected at the two times. As a result, data analysis is incorrect or inaccurate.

In addition, if a data collection and reporting periodicity is reduced, for example, the data collection and reporting periodicity is reduced to 1 second, an amount of the data of the ONU or the ONT collected by the OLT through the OMCI may be extremely large. On average, data is collected and reported for 60 times every minute. Storage media and data transmission channels of the OLT and an analyzer cannot support transmitting and storing such a large amount of data. It can be learned that the foregoing data collection method cannot be used to collect and obtain valid data of a sudden change, and discover a change feature of the sudden change. In addition, when the collection and reporting periodicity is excessively short, the amount of the data to be collected and reported is extremely large. This poses high requirements on transmission devices and storage media.

To resolve the foregoing problem, this application provides a data collection method and a related device, to collect finer-grained performance indicator data, effectively collect performance indicator data with a sudden change, discover a change feature of the sudden change, ensure data analysis accuracy, and reduce an amount of the performance indicator data to be reported.

The technical solutions in the embodiments of this application may be used in a passive optical network (PON), or may be used in a cable television network, a wireless local area network (WLAN) network, or another network. The foregoing communications networks have a same feature: One entity in the network may need to collect data, and another entity may need to receive and analyze the collected data.

Figure 2:
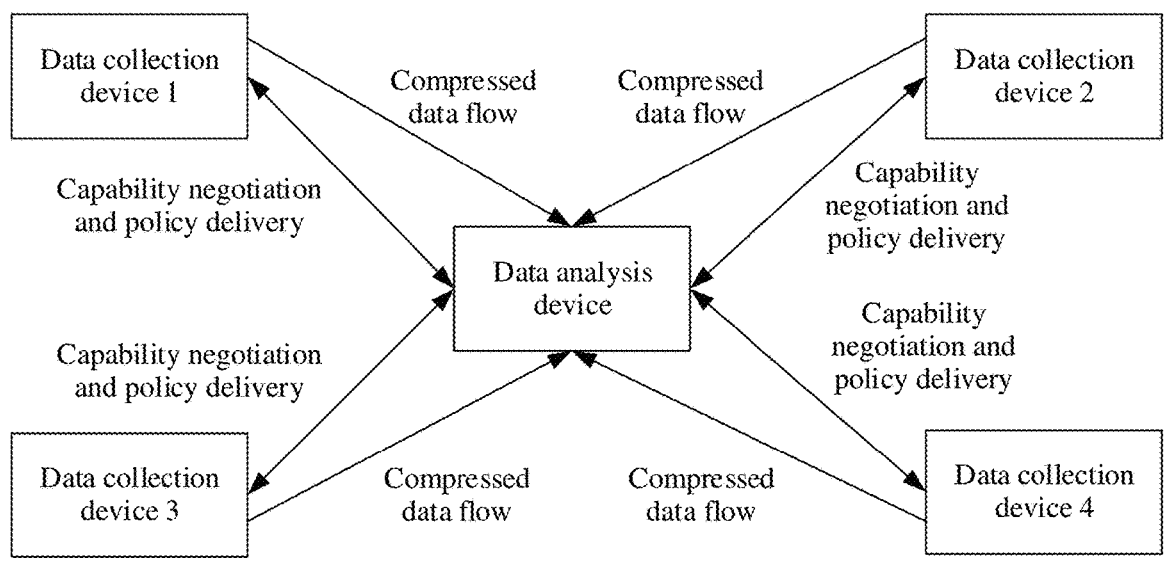
FIG. 2 is a schematic structural diagram of a communications system according to an embodiment of this application.

In an embodiment, as shown in FIG. 2, a data collection device 1 to a data collection device 4 and a data analysis device form a communications system. In the communications system, the data collection device 1 to the data collection device 4 may perform capability negotiation with the data analysis device, collect performance indicator data of the data collection device 1 to the data analysis device 4, and send the performance indicator data to the data analysis device. The data analysis device may perform capability negotiation and policy delivery with the data collection device 1 to the data collection device 4, receive compressed data flows that include the performance indicator data and that are sent by the data collection device 1 to the data collection device 4, and store and analyze the compressed data flows.

Embodiments of this application relate to a data collection device. The data collection device may be an entity configured to receive or transmit a signal, for example, an optical network unit (ONU), an optical line terminal (OLT), a cable modem (CM), a station (STA) or an access point (AP) in a wireless local area network (WLAN). In the embodiments of the disclosure, performance indicator data collected by the data collection device may be performance indicator data of the data collection device, or may be performance indicator data of another device connected to the data collection device. For example, the OLT may collect and report performance indicator data such as transmit optical power and a bias current of the OLT to the data analysis device, or may collect and report, to the data analysis device, performance indicator data such as transmit optical power and a bias current of an ONU connected to the OLT. When collecting the performance indicator data of the ONU, the OLT may collect the performance indicator data of the ONU through an OMCI.

An embodiment of this application further relates to a data analysis device. The data analysis device may be an entity configured to transmit or receive a signal, for example, a distributed cluster server, or an edge analysis board, an edge router. The data analysis device may alternatively be a broadband remote access server (BRAS), or the like.

Figure 3:
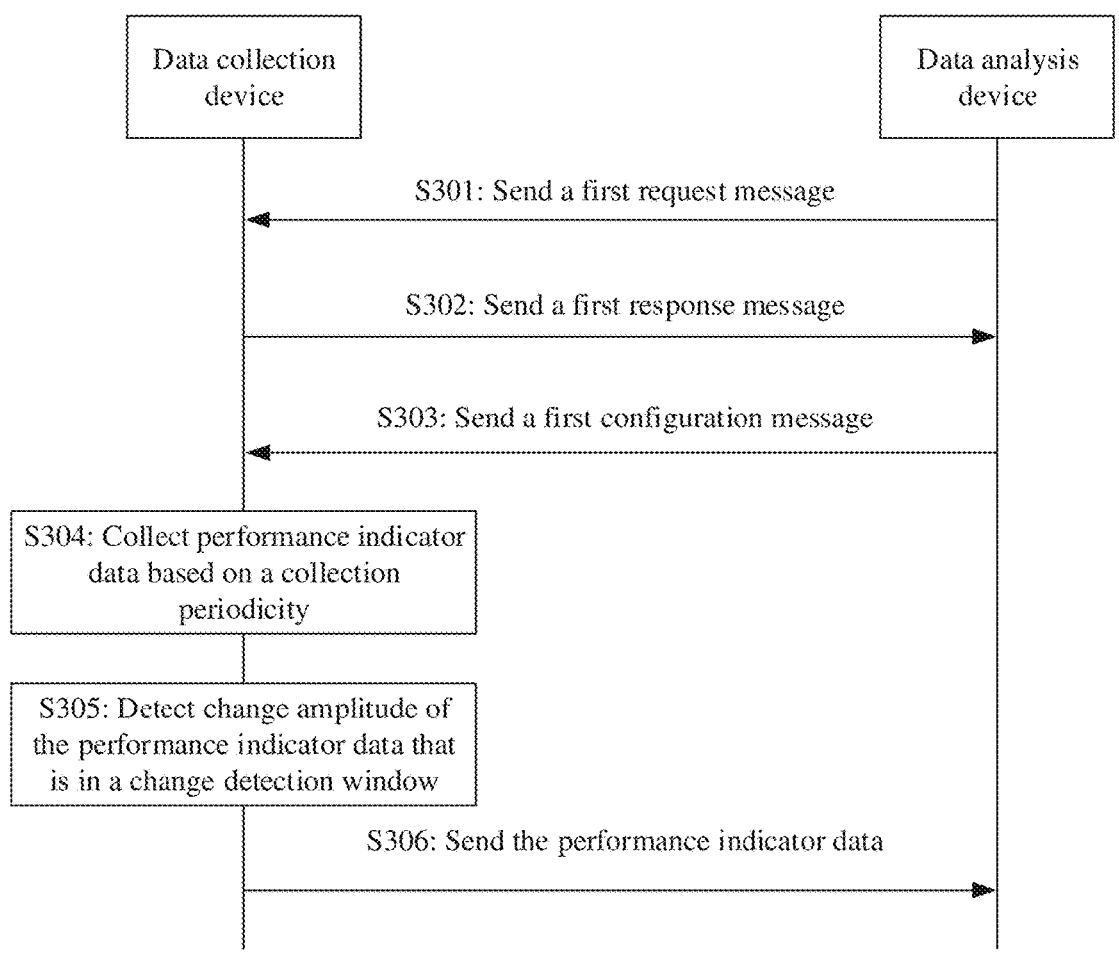
FIG. 3 is a schematic flowchart of an intelligent data collection method according to an embodiment of this application.

FIG. 3 is a schematic flowchart of an intelligent data collection method according to an embodiment of this application. As shown in FIG. 3, the method includes but is not limited to the following operations.

S301: A data analysis device sends a first request message to a data collection device.

After receiving a service requirement, the data analysis device sends the request message to the data collection device based on the service requirement, so that the data collection device can collect and report performance indicator data that meets the service requirement.

It should be noted that one data analysis device may simultaneously send request messages to a plurality of data collection devices, a plurality of data analysis devices may simultaneously send request messages to one data collection device, or a plurality of data analysis devices simultaneously send request messages to a plurality of data collection devices. This is not limited in this application.

In an embodiment, the first request message may be a collection capability request message. The collection capability request message is used to request collection capability information.

The data analysis device may require knowledge of a collection capability of the data collection device first, so as to configure a collection parameter for the data collection device based on the collection capability of the data collection device. In this way, the data collection device collects the performance indicator data based on the delivered collection parameter.

In an embodiment, the first request message may be a data processing capability request message.

The data analysis device may need to negotiate a data processing capability with the data collection device. After collecting the performance indicator data, the data collection device does not directly report the performance indicator data, but may need to perform processing on the collected performance indicator data before reporting the performance indicator data.

It should be noted that the collection capability request message and the data processing capability request message may be combined into one request message and sent to the data analysis device, or may be separately sent to the data analysis device in any sequence. This is not limited in this application.

S302: The data collection device sends a first response message to the data analysis device.

After receiving the first request message sent by the data analysis device, the data collection device encapsulates the collection capability information and/or data processing capability information of the data collection device in the first response message, and sends the first response message to the data analysis device.

If the collection capability request message and the data processing capability request message are a same request message, in other words, the first request message is used to request both of the collection capability information and the data processing capability information, the first response message includes the collection capability information and the data processing capability information.

If the collection capability request message and the data processing capability request message are different request messages, when the first request message is the collection capability request message, the first response message includes the collection capability information, and when the first request message is the data processing capability request message, the first response message includes the data processing capability information.

In an embodiment, the collection capability information of the data collection device may include: a performance indicator corresponding to the performance indicator data, and a collection periodicity and collection precision of the performance indicator.

It should be noted that the performance indicator is an object that can be collected by the data collection device. For example, in a PON network, the performance indicator may be transmit optical power, receive optical power, a bias current, a voltage, a temperature, or another type. The collection periodicity is a time interval at which the data collection device collects the performance indicator data. For example, if the collection periodicity is 1 second, the data collection device collects the data every 1 second. The collection precision is precision of the collected data, and may be precision (resolution) of corresponding key service indicator data collected by the data collection device. For example, the collection precision of the collected receive optical power is 0.01 decibels (dB).

It should be understood that, in an actual data collection process, the data collection device may collect the data based on default collection parameter values. For example, a collection object is a voltage, a collection periodicity is 10 seconds, and a collection precision is 0.01 volts (V). The data collection device may alternatively negotiate with the data analysis device, and collect the data based on collection parameter values configured and delivered by the data analysis device. This is not limited in this application.

In an embodiment, the first response message may alternatively be the data processing capability information.

The data processing capability information sent by the data collection device may include a sequence compression algorithm. The data collection device performs sequence compression on the collected performance indicator data, and then sends the collected performance indicator data to the data analysis device. In this way, an amount of the data to be reported can be reduced, storage pressure of the data analysis device can be reduced, and requirements on a data transmission channel can be lowered. In an embodiment, the sequence compression algorithm may be a differential coding algorithm, or another type of compression algorithm. This is not limited in this application.

S303: The data analysis device sends a first configuration message to the data collection device.

After receiving the first response message sent by the data collection device, the data analysis device obtains the collection capability information of the data collection device, and determines duration of a data reporting periodicity based on the performance indicator corresponding to the performance indicator data and the collection periodicity of the performance indicator. The data collection device may need to periodically report the collected data (namely, key performance indicator data) based on the determined duration of the data reporting periodicity. For example, if the duration of the data reporting periodicity is 5 minutes, the data collection device may need to report the collected key performance indicator data every 5 minutes. It should be understood that, the periodically reported key performance indicator data is data collected at the end of the data reporting periodicity instead of data collected in the entire data reporting periodicity.

Further, the data analysis device determines duration of a change detection window based on the performance indicator corresponding to the performance indicator data and the collection periodicity of the performance indicator that are in the collection capability information of the data collection device. The change detection window includes multiple collection periodicities and is used to detect whether the collected key performance indicator data has a sudden change. It should be noted that the change detection window slides in a time sequence, and may span adjacent data reporting periodicities.

Further, the data analysis device determines a change detection threshold based on the performance indicator corresponding to the performance indicator data and the collection precision of the performance indicator that are in the collection capability information of the data collection device. The change detection threshold is used to compare with a change degree value (namely, change amplitude) of the key performance indicator data that is in the change detection window. If the change degree value is greater than or equal to the change detection threshold, it indicates that the key performance indicator data that is in the change detection window has a sudden change, and the key performance indicator data may be reported to the data analysis device in real time. If the change degree value is less than the change detection threshold, it indicates that the key performance indicator data that is in the change detection window does not have a sudden change, and next detection continues to be performed in the change detection window.

It should be noted that the configuration message sent by the data analysis device to the data collection device may only include any one or any combination of the duration of the data reporting periodicity, the duration of the change detection window, and the change detection threshold. For example, the configuration message only includes the duration of the change detection window, or only includes the change detection threshold, or includes the duration of the data reporting periodicity and the change detection threshold. This is not limited in this application.

It should be understood that, the data analysis device may generate a detection parameter value, namely, the duration of the change detection window and/or the change detection threshold, in the first configuration message based on the performance indicator corresponding to the performance indicator data and the collection periodicity or the collection precision of the performance indicator that are in the received collection capability information, and sends the detection parameter value to the data collection device. Alternatively, a detection parameter value pre-stored in the data analysis device or obtained in another manner may be sent to the data collection device. This is not limited in this application.

If sudden change data detection needs to be performed on performance indicator data that is of more than one performance indicator and that is collected by the data collection device, the data analysis device may further indicate, in the first configuration message, a correspondence between each performance indicator and a detection parameter value corresponding to the performance indicator. For example, the first configuration message carries each performance indicator and the detection parameter value corresponding to the performance indicator.

S304: The data collection device collects performance indicator data of a target device based on the collection periodicity.

The target device may be the data collection device, or may be another device connected to the data collection device. For example, in a PON network, the data collection device is an OLT, and correspondingly, the target device may be the OLT, or may be an ONU connected to the OLT. The data collection device may alternatively be an ONU, and correspondingly, the target device may be the ONU.

In an embodiment, the performance indicator data may be the key performance indicator data. It may be understood that, the data collection device may collect different types of data based on a service requirement or an actual requirement, and the key performance indicator data is only one type of the data.

The data collection device may collect the key performance indicator data based on the default collection parameter values, and the collection parameter values may be pre-stored in the data collection device. Alternatively, the data collection device may receive, after negotiating with the data analysis device, the collection parameter values configured and delivered by the data analysis device, and collect the key performance indicator data based on the collection parameter values. For example, the key performance indicator data is collected based on the configured collection periodicity and collection precision.

S305: The data collection device detects change amplitude of the performance indicator data that is in the change detection window.

The data collection device detects a change degree of the performance indicator data that is in the entire change detection window. That is, the data collection device detects the change amplitude.

In an embodiment, the data collection device detects a value relationship between the change detection threshold and a difference between a maximum value and a minimum value of the collected performance indicator data that is in the change detection window.

For example, if the collection periodicity of the data collection device is 1 second, the collected performance indicator is the receive optical power, the collection precision is 0.01 dB, the duration of the change detection window is 5 seconds, and the change detection threshold is 0.20 dB, the data collection device collects five values of the receive optical power within 5 seconds. In other words, five pieces of to-be-detected data exist in the change detection window. If the five pieces of to-be-detected data are respectively 0.48 dB, 0.57 dB, 0.61 dB, 0.69 dB, and 0.70 dB, a maximum value is 0.70 dB, and a minimum value is 0.48 dB, a difference between the maximum value and the minimum value is 0.22 dB, which exceeds the change detection threshold 0.20 dB. It indicates that the received optical power that is in the change detection window has a sudden change. The data collection device may report the five pieces of data that are in the change detection window to the data analysis device in real time.

Further, a change detection method may not only be the foregoing difference comparison method, but also a method such as an average difference method or a standard difference method. The change amplitude may not only be a difference between the maximum value and the minimum value of the performance indicator data that is in the change detection window, but also an average difference or a standard difference of the performance indicator data.

For example, if the collection periodicity of the data collection device is still 1 second, the collected performance indicator is still the receive optical power, the collection precision is 0.01 dB, the duration of the change detection window is still 5 seconds, and the change detection threshold is 0.05 dB, the data collection device collects five values of the receive optical power within 5 seconds. In other words, five pieces of to-be-detected data exist in the change detection window. If the five pieces to-be-detected data are respectively 0.48 dB, 0.57 dB, 0.61 dB, 0.69 dB, and 0.70 dB, and if the average difference method is used, an average value of the five pieces of to-be-detected data is first obtained through calculation, and is 0.61 dB. In this case, an average value of differences between the five pieces of to-be-detected data and the average value is 0.07 dB, which exceeds the change detection threshold 0.05 dB. It indicates that the received optical power that is in the change detection window has a sudden change. The data collection device may report the five pieces of data that are in the change detection window to the data analysis device in real time.

Certainly, another change detection method may alternatively be used to detect the performance indicator data that is in the change detection window. The change amplitude is obtained through calculation based on a corresponding calculation rule or formula, and is compared with the change detection threshold. Whether the performance indicator data that is in the change detection window needs to be reported is determined based on a comparison result. A specific detection method to be selected is not limited in this application.

It should be noted that different detection methods lead to different configuration of the change detection threshold.

It may be understood that when the collection periodicity is set to a smaller value, the data collection device can collect finer-grained (second-level or millisecond-level) performance indicator data, in other words, collect more performance indicator data. However, according to a current processing method, all the collected performance indicator data is sent to the data analysis device, and this causes an excessively large amount of data to be reported. The data transmission channel cannot meet a requirement for transmitting such a huge amount of data. In addition, after receiving the reported data, the data analysis device also encounters a difficulty in a process of storing the reported data. In this embodiment of this application, the change detection window is set. After detecting the change amplitude of the collected performance indicator data that is in the change detection window, the data collection device determines whether to report the performance indicator data. In this way, finer-grained performance indicator data can be collected by the data collection device, performance indicator data with a sudden change can be collected, and a change feature of the sudden change data can be discovered. In addition, the amount of the data to be reported can be greatly reduced, and the storage pressure of the data analysis device and transmission pressure of the transmission channel can be reduced.

S306: The data collection device sends the performance indicator data to the data analysis device.

After detecting the performance indicator data that is in the change detection window, the data collection device determines whether the performance indicator data that is in the change detection window needs to be reported. When the change amplitude of the performance indicator data that is in the change detection window is greater than or equal to the change detection threshold, the collection device further processes the performance indicator data that is in the change detection window, and sends the performance indicator data that is in the change detection window to the data analysis device.

It should be understood that the performance indicator data (namely, the reported performance indicator data) sent by the data collection device to the data analysis device is only a part of the performance indicator data collected by the data collection device. The performance indicator data reported by the data collection device may include the performance indicator data that is in the change detection window and whose change amplitude is greater than or equal to the change detection threshold, and may further include the performance indicator data periodically reported by the data collection device (namely, the performance indicator data collected at the end moment of each data reporting periodicity).

In an embodiment, before the data collection device sends the performance indicator data that is in the change detection window to the data analysis device, the data collection device removes sent performance indicator data that is in the change detection window, and then sends, to the data analysis device, remaining unsent performance indicator data that is in the change detection window.

Figure 4:
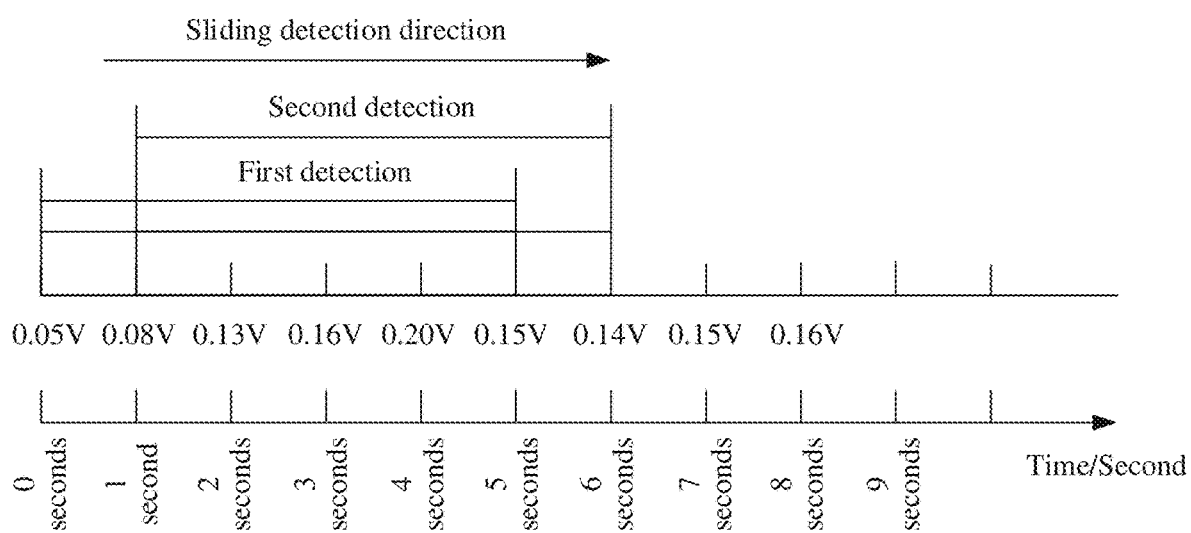
FIG. 4 is a schematic diagram of data deduplication according to an embodiment of this application.

For example, FIG. 4 is a schematic diagram of data deduplication according to an embodiment of this application. As shown in FIG. 4, the data collection device collects the performance indicator data in a time sequence, where the collection periodicity is 1 second, the performance indicator is a voltage, the collection precision is 0.01 V, the duration of the change detection window is 5 seconds, and the change detection threshold is 0.10 V. The first detection is performed in the change detection window to collect voltage data within the first 5 seconds, namely, voltage data within 0 to 5 seconds (excluding voltage data collected at the $5^{th}$ second): 0.05 V, 0.08 V, 0.13 V, 0.16 V, and 0.20 V. The difference comparison method is used, a maximum value of the voltage data is 0.20 V, a minimum value is 0.05 V, and the difference between the maximum value and the minimum value is 0.15 V, which exceeds the change detection threshold 0.10 V. In this case, the data collection device needs to report the voltage data that is within the 5 seconds in the change detection window. Because the change detection window slides, when the second detection is performed in the change detection window, data within 1 to 6 seconds is detected, namely, voltage data within 1 to 6 seconds: 0.08 V, 0.13 V, 0.16 V, 0.20 V, and 0.15 V. In this case, in the current change detection window, the maximum value of the voltage data is 0.20 V, the minimum value is 0.08 V, and the difference between the maximum value and the minimum value is 0.12 V, which still exceeds the change detection threshold 0.10 V. In this case, the data collection device also needs to report the voltage data that is within the 5 seconds in the current change detection window. However, before reporting, the data collection device compares the voltage data within 1 to 6 seconds with the voltage data that is in the change detection window and that is reported at a previous detection moment, and performs deduplication on the voltage data. Because the voltage data within 0 to 5 seconds is reported at the previous detection moment, and the voltage data within 1 to 6 seconds is in the current change detection window, data within 1 to 5 seconds are duplicated. The four pieces of data: 0.08 V, 0.13 V, 0.16 V, and 0.20 V, exist in the change detection window in the two detections. The data collection device has reported the data within 1 to 5 seconds to the data analysis device during the first data reporting. Therefore, the data collection device only needs to report the data within 5 to 6 seconds during the second data reporting. That is, only the data 0.15 V needs to be reported. According to a same change detection rule, the change detection window continues to slide, and a next detection is performed, and voltage data within 2 to 7 seconds is detected. If the voltage data needs to be reported after the detection, the deduplication is performed on the voltage data within 1 to 6 seconds before reporting. The rest may be deduced by analogy, and details are not described herein again.

It should be understood that, as long as a change detection window in which sudden change data exists overlaps with the current change detection window (in other words, duplicate detection data exists in the change detection windows), a deduplication processing may need to be performed. The change detection window in which the sudden change data exists may be a change detection window corresponding to a previous detection moment of the current change detection window, or may be a change detection window corresponding to an earlier detection moment.

It should be noted that the foregoing embodiment is described by using an example in which the deduplication processing is performed each time the change detection window slides by 1 second. Alternatively, the deduplication processing may be performed each time the change detection window slide by 2 seconds or 3 seconds. For example, the first detection is performed on data within 0 to 5 seconds, the second detection is performed on data within 2 to 7 seconds, and then the deduplication processing is performed on the data within 2 to 5 seconds. In addition, a sliding step of the change detection window may be less than or equal to the duration of the change detection window. A deduplication rule and a sliding step of the change detection window are not limited in this application.

It may be understood that, the deduplication processing is performed on the to-be-reported performance indicator data that is in the current change detection window, to remove the sent performance indicator data, so that the amount of the to-be-reported performance indicator data can be further reduced, and the storage pressure of the data analysis device and the transmission pressure of the transmission channel can be reduced.

In an embodiment, the data collection device sends, to the data analysis device, the performance indicator data collected at the end moment of each data reporting periodicity.

The data collection device keeps collecting the performance indicator data based on the collection periodicity. Regardless of a value relationship between the change detection threshold and change amplitude of the performance indicator data that is in the corresponding change detection window and that is collected at the end moment of the data reporting periodicity, the performance indicator data needs to be directly sent to the data analysis device. The data reporting periodicity may be configured and delivered by the data analysis device to the data collection device, or may be pre-stored by the data collection device. This is not limited in this application. For example, if the data reporting periodicity is 3 minutes, performance indicator data collected by the data collection device at the end moment of the $3^{rd}$ minute is sent to the data analysis device, and performance indicator data collected at the end moment of the $6^{th}$ minute also needs to be sent to the data analysis device. Subsequently, based on the data reporting periodicity, the performance indicator data collected at the end of each periodicity needs to be reported periodically. Certainly, the data reporting periodicity may alternatively be configured or set based on a service requirement or an actual requirement. This is not limited in this application.

It may be understood that the data analysis device receives the performance indicator data periodically reported by the data collection device, and the performance indicator data that has a sudden change and that is reported after detected in the change detection window, so that finer-grained performance indicator data can be collected, the change feature of the sudden change data can be discovered, the accuracy of data analysis performed by the data analysis device can be ensured, the amount of the data to be reported can be greatly reduced, and the storage pressure of the data analysis device and the transmission pressure of the transmission channel can be reduced.

In an embodiment, the data collection device compresses, based on a sequence compression algorithm, the performance indicator data obtained after the deduplication processing and/or the performance indicator data collected at the end moment of the data reporting periodicity, to obtain a compressed data flow, and sends the compressed data flow to the data analysis device.

The data collection device may previously receive the sequence compression algorithm configured and delivered by the data analysis device, and compress, based on the algorithm, the performance indicator data that is in the change detection window and that is obtained after the deduplication processing and/or the performance indicator data collected at the end moment of the data reporting periodicity, to obtain a compressed byte flow. Alternatively, the data collection device may compress, based on the sequence compression algorithm prestored in the data collection device, the performance indicator data that is in the change detection window and that is obtained after the deduplication processing and/or the performance indicator data collected at the end moment of the data reporting periodicity, to obtain a compressed byte flow. The sequence compression algorithm may be a differential coding algorithm, a subband coding algorithm, a Huffman coding algorithm, or the like. A source of the sequence compression algorithm and a specific selected coding algorithm are not limited in this application.

Further, after receiving the compressed data flow sent by the data collection device, the data analysis device decompresses the compressed data flow based on the corresponding sequence compression algorithm, to obtain the performance indicator data obtained after the deduplication processing and/or the performance indicator data collected at the end moment of the data reporting periodicity.

It may be understood that the data collection device compresses the performance indicator data that is in the change detection window and that is obtained after the deduplication processing and/or the performance indicator data collected at the end moment of the data reporting periodicity, the amount of the data to be reported can be further reduced, the transmission pressure of the transmission channel can be reduced, data transmission efficiency can be improved, and bandwidth utilization can be improved.

It should be understood that operations S301 to S306 in the foregoing method embodiment are merely general schematic descriptions, and should not constitute a specific limitation. The related operations may be added, reduced, or combined based on a requirement.

Based on the data collection method shown in FIG. 3, how to restore a logical topology structure of a network and locate a sudden change fault is described. For ease of understanding, an example in which the data collection device is an ONU and an OLT and the data analysis device is a distributed cluster server is used for description.

Figure 5:
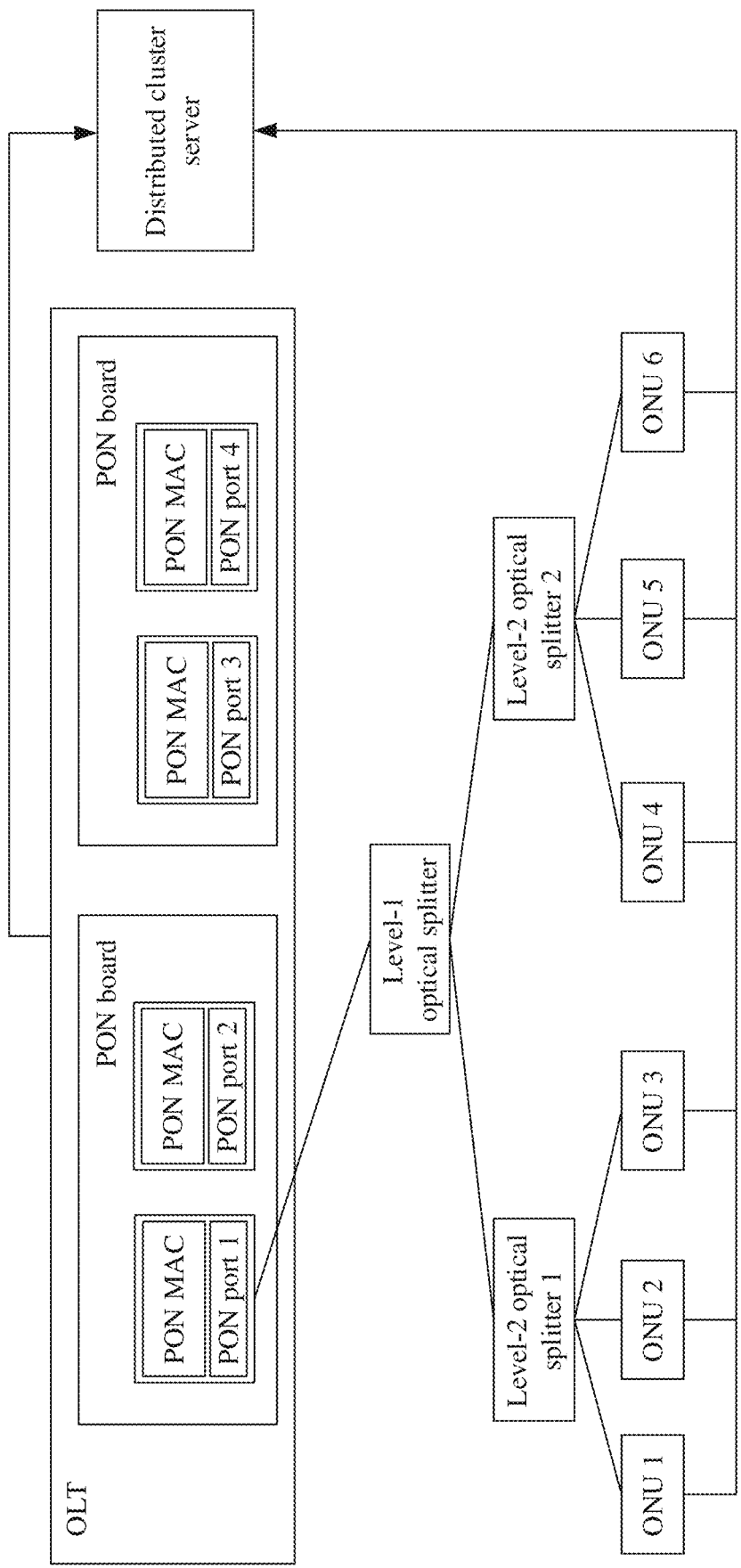
FIG. 5 is a schematic diagram of logical topology structure restoration and fault locating according to an embodiment of this application.

FIG. 5 is a schematic diagram of logical topology structure restoration and fault locating according to an embodiment of this application. As shown in FIG. 5, an OLT exists in a PON network, where the OLT includes multiple PON boards, each PON board includes one or more PON ports, each PON port is controlled by one passive optical network media access control (PON MAC) chip, and each PON port is connected to multiple ONUs through a level-1 optical splitter and a level-2 optical splitter. For example, an ONU 1, an ONU 2, and an ONU 3 are connected to a PON port 1 on the OLT through a level-2 optical splitter 1 and the level-1 optical splitter, and an ONU 4, an ONU 5, and an ONU 6 are also connected to the PON port 1 on the OLT through a level-2 optical splitter 2 and the level-1 optical splitter. The distributed cluster server is connected to all the ONUs and the OLT, and receives collected service indicator data (for example, receive optical power) sent by all the ONUs and the OLT. The ONU 1 to the ONU 6 each send, to the distributed cluster server, data that is of receive optical power and that is obtained after deduplication processing, and data that is of receive optical power and that is collected at an end moment of a data reporting periodicity. The OLT also may need to send, to the distributed cluster server, data that is of receive optical power and that is obtained after deduplication processing, and data that is of receive optical power and that is collected at the end moment of a data reporting periodicity. It should be noted that, when reporting the collected data of the receive optical power to the distributed cluster server, the ONU sends an identification (ID) of its own, and the distributed cluster server may identify, based on the ID, the ONU connected to a PON port in an OLT. When the distributed cluster server performs data analysis, if the distributed cluster server finds that at a moment, the receive optical power data of the ONU 1, the ONU 2, and the ONU 3 connected to the PON port 1 in the OLT device all changes, and change trends are close, but the receive optical power data of the ONU 4, the ONU 5, and the ONU 6 does not change, the distributed cluster server may perceive, through analysis, that the ONU 1, the ONU 2, and the ONU 3 are directly connected to a same level-2 optical splitter (namely, the level-2 optical splitter 1). After analyzing the received data, the distributed cluster server restores a network topology for the PON port 1 and the ONU 1, the ONU 2, and the ONU 3 that are connected to the same level-2 optical splitter. According to a same principle, the distributed cluster server may further restore a network topology for each PON port in the OLT and ONUs that are connected to the PON port, thereby restoring an entire ODN network.

It should be understood that a sudden change fault may be located according to a same principle. For example, in the foregoing example, when performing the data analysis, the distributed cluster server finds that the data of the receive optical power of the ONU 1, the ONU 2, and the ONU 3 each has a sudden change, and receive optical power of at least one of the ONUs is lower than a normal receive optical power threshold, but the receive optical power of the ONU 4, the ONU 5, and the ONU 6 each does not have a sudden change and is within a normal range of the receive optical power. It indicates that a fault occurs on the devices connected to the ONU 1, the ONU 2, and the ONU 3 (including the level-2 optical splitter 1, and a level-2 optical fiber that is an optical fiber between the level-2 optical splitter 1 and the level-1 optical splitter). Therefore, the distributed cluster server may determine that the level-2 optical splitter 1 or the level-2 optical fiber is faulty, and consequently, the data of the receive optical power of the ONU 1, the ONU 2, and the ONU 3 has a sudden change. In this way, the sudden change fault is located.

It should be noted that, in an actual application scenario, the distributed cluster server may need to simultaneously receive data sent by multiple OLTs, and data sent by multiple ONUs connected to multiple PON ports in the multiple OLTs, and store and analyze the data, to implement an ODN logical topology restoration and sudden change fault locating. Although there are more OLTs and ONUs, and the ODN becomes more complex, an embodiment and a data collection method are similar to those in the foregoing embodiment. Details are not described herein again.

To better implement the foregoing solutions in the embodiments of this application, correspondingly, the following further provides related apparatuses cooperating to implement of the foregoing solutions.

Figure 6:
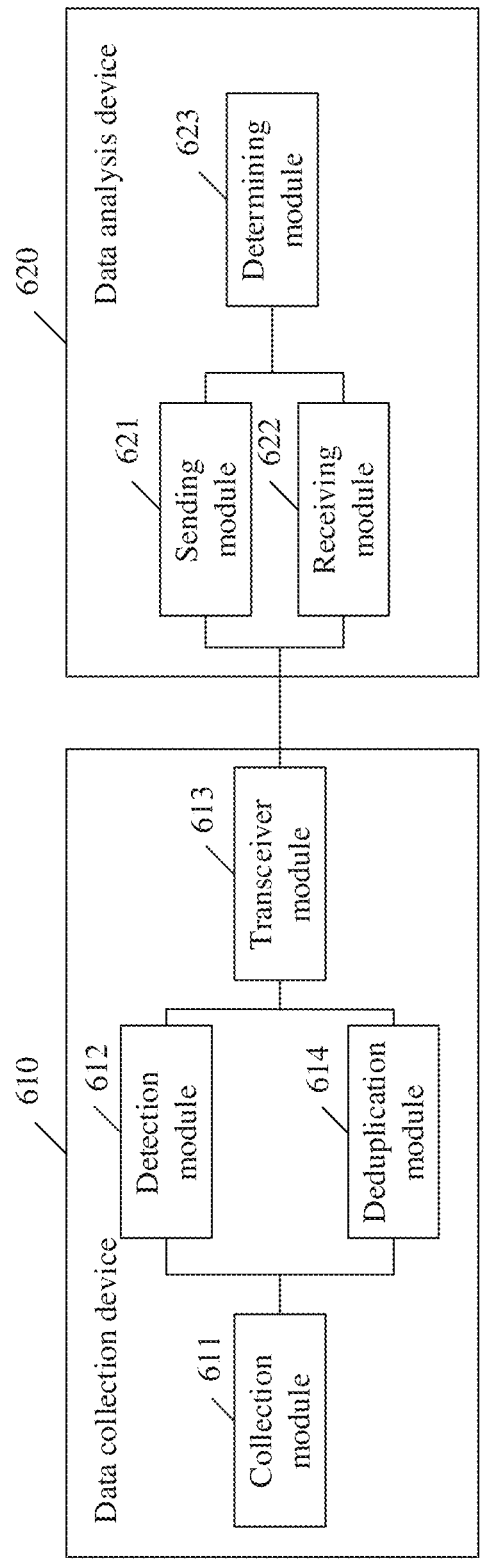
FIG. 6 is a schematic diagram of a communications system according to an embodiment of this application.

FIG. 6 is a schematic diagram of a communications system according to an embodiment of this application. As shown in FIG. 6, the communications system includes a data collection device 610 and a data analysis device 620. The data collection device 610 includes at least a collection module 611, a detection module 612, and a transceiver module 613.

The collection module 611 is configured to collect performance indicator data of a target device based on a collection periodicity.

The detection module 612 is configured to detect change amplitude of the collected performance indicator data that is in a change detection window, where the change detection window includes multiple collection periodicities.

The transceiver module 613 is configured to: when the detection module 612 detects that the change amplitude of the performance indicator data that is in the change detection window is greater than or equal to a change detection threshold, send the performance indicator data that is in the change detection window to the data analysis device.

In this embodiment of this application, the detection module 612 detects the performance indicator data that is in the change detection window and that is collected by the collection module 611, and when the change amplitude of the performance indicator data that is in the change detection window is greater than or equal to the change detection threshold, controls the transceiver module 613 to send the performance indicator data that is in the change detection window to the data analysis device, so that finer-grained performance indicator data can be collected, performance indicator data with a sudden change can be effectively collected, a change feature of the sudden change can be discovered, data analysis accuracy can be ensured, and an amount of the performance indicator data to be reported can be reduced.

In an embodiment, the transceiver module 613 is further configured to receive a first configuration message sent by the data analysis device, where the first configuration message includes duration of the change detection window and/or the change detection threshold.

In an embodiment, the performance indicator data is one of transmit optical power, receive optical power, a bias current, a voltage, and a temperature.

In an embodiment, the transceiver module 613 is further configured to send collection capability information to the data analysis device, where the collection capability information of the data collection device includes: a performance indicator corresponding to the performance indicator data, and a collection periodicity and collection precision of the performance indicator.

In an embodiment, the transceiver module 613 is further configured to send data processing capability information to the data analysis device, where the collection capability information of the data collection device includes a sequence compression algorithm, and the sequence compression algorithm is used to compress the performance indicator data sent to the data analysis device.

In an embodiment, the detection module 612 is configured to detect a value relationship between the change detection threshold and a difference between a maximum value and a minimum value of collected key performance indicator data that is in the change detection window.

In an embodiment, the data collection device 610 further includes a deduplication module 614, configured to remove sent performance indicator data that is in the change detection window. The transceiver module 613 is further configured to send, to the data analysis device, remaining performance indicator data that is in the change detection window and that is obtained after the deduplication module 614 removes the sent performance indicator data.

In an embodiment, the transceiver module 613 is further configured to send, to the data analysis device, performance indicator data collected at an end moment of each data reporting periodicity.

It may be understood that the transceiver module 613 in this embodiment of this application may be implemented by a transceiver or a transceiver-related circuit component, the collection module 611 may be implemented by a collector or a collector-related circuit component, and the detection module 612 and the deduplication module 614 each may be implemented by a processor or a processor-related circuit component.

The data analysis device 620 includes at least a sending module 621 and a receiving module 622.

The sending module 621 is configured to send a first configuration message to the data collection device, where the first configuration message includes duration of a change detection window and a change detection threshold, the duration of the change detection window and the change detection threshold are used by the data collection device to detect a value relationship between the change detection threshold and the change amplitude of performance indicator data of a target device in the change detection window.

The receiving module 622 is configured to receive performance indicator data that is sent by the data collection device, that is in the change detection window, and that exceeds the change detection threshold.

In an embodiment, the performance indicator data is one of transmit optical power, receive optical power, a bias current, a voltage, and a temperature.

In an embodiment, the data analysis device 620 further includes a determining module 623, configured to determine the duration of the change detection window based on a performance indicator corresponding to the performance indicator data and a collection periodicity of the performance indicator. The determining module 623 is further configured to determine the change detection threshold based on the performance indicator corresponding to the performance indicator data and collection precision of the performance indicator.

In an embodiment, the receiving module 622 is further configured to receive collection capability information sent by the data collection device, where the collection capability information of the data collection device includes: the performance indicator corresponding to the performance indicator data, and the collection periodicity and the collection precision of the performance indicator.

In an embodiment, the receiving module 622 is further configured to receive data processing capability information sent by the data collection device, where the data processing capability information includes a sequence compression algorithm, and the sequence compression algorithm is used by the data collection device to compress the sent performance indicator data.

It may be understood that the sending module 621 and the receiving module 622 in this embodiment of this application may be implemented by a transceiver or a transceiver-related circuit component, and the processing module 623 may be implemented by a processor or a processor-related circuit component.

It should be noted that the foregoing structure of the data collection device or the data analysis device and the data collection process are merely used as an example, and should not constitute a specific limitation. Units in the data collection device or the data analysis device may be added, reduced, or combined as required.

Figure 7:
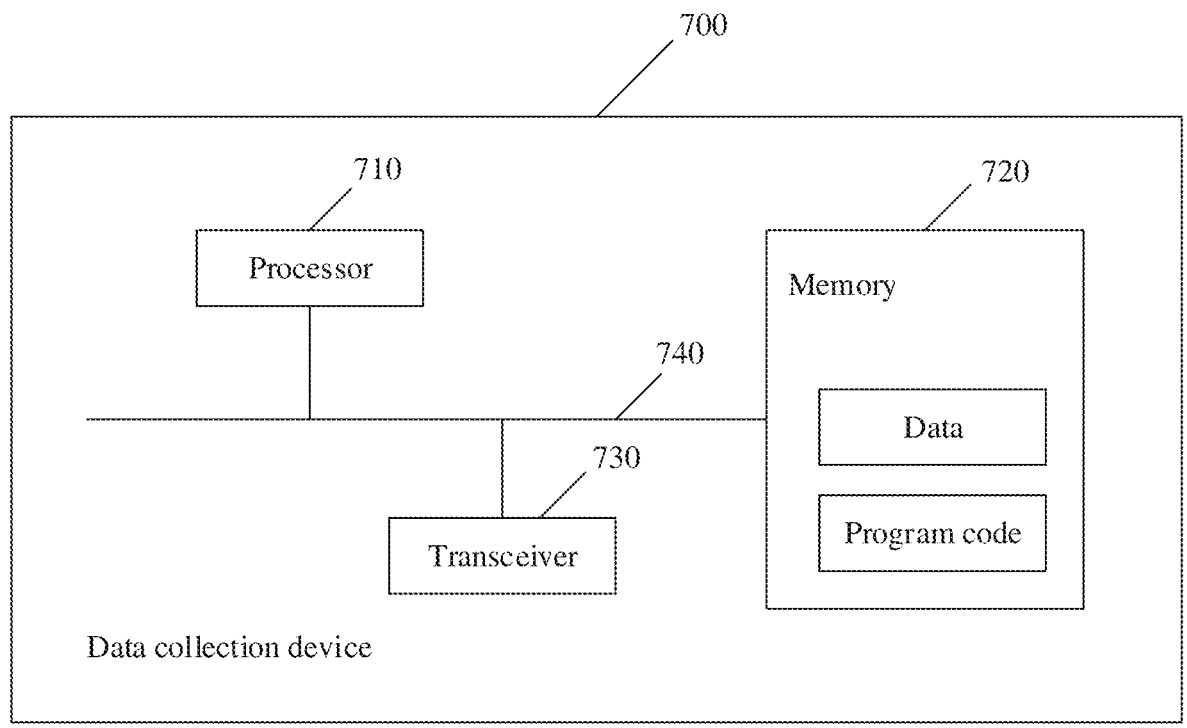
FIG. 7 is a schematic structural diagram of a data collection device according to an embodiment of this application.

FIG. 7 is a schematic structural diagram of a data collection device according to an embodiment of this application. The data collection device 700 includes a processor 710, a memory 720, and a transceiver 730. The processor 710, the memory 720, and the transceiver 730 are connected to each other through a bus 740. The memory 720 stores an instruction or a program, and the processor 710 is configured to execute the instruction or the program stored in the memory 720. When the instruction or the program stored in the memory 720 is executed, the processor 710 is configured to perform the operations performed by the collection module 611, the detection module 612, and the deduplication module 614 in the foregoing embodiment, and the transceiver 730 is configured to perform the operations performed by the transceiver module 613 in the foregoing embodiment.

It should be noted that the data collection device 610 or the data collection device 700 in the embodiments of this application may correspond to the data collection device in the method embodiment provided in this application. In addition, operations and/or functions of each module in the data collection device 610 or the data collection device 700 are separately used to implement corresponding procedures of each method in FIG. 1 to FIG. 5. For brevity, details are not described herein again.

Figure 8:
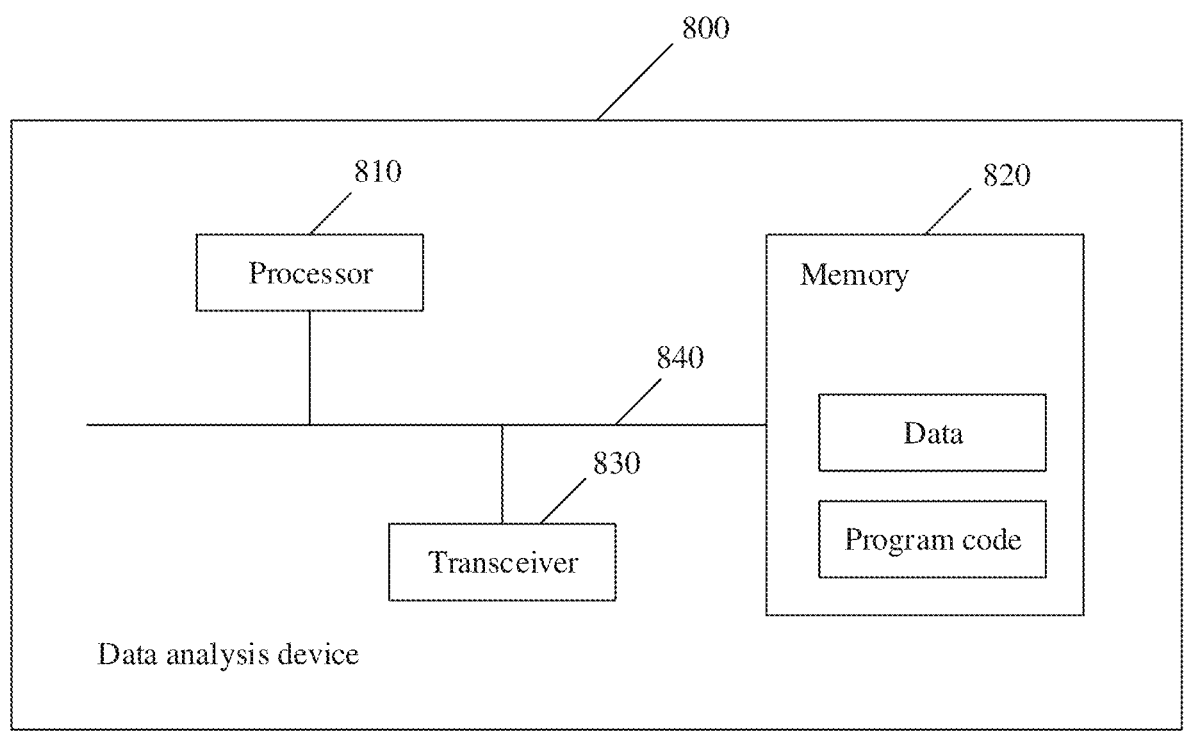
FIG. 8 is a schematic structural diagram of a data analysis device according to an embodiment of this application.

FIG. 8 is a schematic structural diagram of a data analysis device according to an embodiment of this application. The data analysis device 800 includes a processor 810, a memory 820, and a transceiver 830. The processor 810, the memory 820, and the transceiver 830 are connected to each other through a bus 840. The memory 820 stores an instruction or a program, and the processor 810 is configured to execute the instruction or the program stored in the memory 820. When the instruction or the program stored in the memory 820 is executed, the processor 810 is configured to perform the operations performed by the determining module 623 in the foregoing embodiment, and the transceiver 830 is configured to perform the operations performed by the sending module 621 and the receiving module 622 in the foregoing embodiment.

It should be noted that the data analysis device 620 or the data analysis device 800 in the embodiments of this application may correspond to the data analysis device in the method embodiment provided in this application. In addition, operations and/or functions of each module in the data analysis device 620 or the data analysis device 800 are separately used to implement corresponding procedures of each method in FIG. 1 to FIG. 5. For brevity, details are not described herein again.

An embodiment of this application further provides a computer-readable storage medium. The computer-readable storage medium stores a computer program. When the program is performed by a processor, a procedure related to a data collection device or a data analysis device in the data collection method provided in the foregoing method embodiments may be implemented.

An embodiment of this application further provides a computer program product. When the computer program product runs on a computer or a processor, the computer or the processor is enabled to perform one or more operations in any one of the foregoing data collection methods. When the foregoing modules in the device are implemented in a form of a software functional unit and sold or used as an independent product, the modules may be stored in the computer-readable storage medium.

It should be understood that, the processor in the embodiments of this application may be a central processing unit (CPU), or may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor, or may be any conventional processor, or the like.

It should be further understood that the memory mentioned in the embodiments of this application may be a volatile memory or a nonvolatile memory, or may include both a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. Through example but not limiting description, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct rambus random access memory (DR RAM).

It should be noted that when the processor is a general-purpose processor, a DSP, an ASIC, an FPGA or another programmable logic device, a discrete gate or a transistor logic device, or a discrete hardware component, a memory (a storage module) is integrated into the processor.

It should be noted that the memory described in this specification aims to include but is not limited to these memories and any memory of another proper type.

It should be further understood that "first", "second", "third", "fourth", and various numbers in this specification are merely used for differentiation for ease of description, and are not construed as a limitation to the scope of this application.

It should be understood that the term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

It should be understood that sequence numbers of the foregoing processes do not mean execution sequences in the embodiments of this application. The execution sequences of the processes should be determined based on functions and internal logic of the processes, and should not be construed as any limitation on the embodiments of this application.

A person of ordinary skill in the art may be aware that, in combination with the examples described in the embodiments disclosed in this specification, units and algorithm operations may be implemented by electronic hardware or a combination of computer software and electronic hardware. Whether the functions are performed by hardware or software depends on a particular application and a design constraint of the technical solutions. A person skilled in the art may use different methods to implement the described functions for each particular application, but it should not be considered that the embodiment goes beyond the scope of this application.

It may be clearly understood by a person skilled in the art that for the purpose of convenient and brief description, for a detailed working process of the described system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiments are merely examples. For example, division into units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between apparatuses or units may be implemented in an electronic form, a mechanical form, or in another form.

The units described as separate parts may or may not be physically separate, and parts displayed as units may or may not be physical units, in other words, may be located in one position, or may be distributed on a plurality of network units. Some or all of the units may be selected based on an actual requirement to achieve the objectives of the solutions of the embodiments.

In addition, function units in the embodiments of this application may be integrated into one processing unit, or each of the units may exist alone physically, or two or more units are integrated into one unit.

When the functions are implemented in a form of a software functional unit and sold or used as an independent product, the functions may be stored in a computer-readable storage medium. Based on such an understanding, the technical solutions of this application essentially, or the part contributing to the current technology, or some of the technical solutions may be implemented in a form of a software product. The software product is stored in a storage medium, and includes several instructions for instructing a computer device (which may be a personal computer, a server, or a network device) to perform all or some of the operations of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

A sequence of the operations of the method in the embodiments of this application may be adjusted, combined, or deleted based on an actual requirement.

The modules in the apparatus in the embodiments of this application may be combined, divided, and deleted based on an actual requirement.

In conclusion, the foregoing embodiments are merely intended for describing the technical solutions in this application, but not for limiting this application. Although this application is described in detail with reference to the foregoing embodiments, a person of ordinary skill in the art should understand that the technical solutions described in the foregoing embodiments may still be modified, or some technical features in the technical solutions may be equivalently replaced. These modifications or replacements do not make the essence of the corresponding technical solutions fall outside the scope of the technical solutions of the embodiments of this application.

What is claimed is:

1. A data collection method, comprising:
   receiving a first configuration message sent by a data analysis device, the first configuration message including a duration of a first change detection window and a change detection threshold;
   collecting, by a data collection device, performance indicator data of a target device based on a first collection periodicity;
   detecting a change amplitude of the collected performance indicator data within the first change detection window by detecting a value relationship between the change detection threshold and a difference between a maximum value and a minimum value of collected key performance indicator data that is in the first change detection window, wherein the first change detection window comprises multiple collection periodicities; and
   in response to detecting that the change amplitude of the performance indicator data is greater than or equal to the change detection threshold, sending the performance indicator data within the first change detection window to the data analysis device, including:
   removing, by the data collection device, sent performance indicator data that has been sent and is in the first change detection window, and sending remaining performance indicator data that is in the first change detection window to the data analysis device, wherein the sent performance indicator data has been sent in a second change detection window, and the first change detection window is slid based on the second change detection window.

2. The method according to claim 1, wherein the performance indicator data is one of a transmit optical power, a receive optical power, a bias current, a voltage, and a temperature.

3. The method according to claim 1, wherein before receiving the first configuration message sent by the data analysis device, the method further comprises:
   sending collection capability information of the collection device to the data analysis device, wherein
   the collection capability information of the collection device comprises: a performance indicator corresponding to the performance indicator data, and a collection periodicity and collection precision of the performance indicator.

4. The method according to claim 3, further comprising:
   sending data processing capability information of the collection device to the data analysis device, wherein
   the data processing capability information comprises a sequence compression algorithm, and the sequence compression algorithm is used to compress the performance indicator data sent to the data analysis device.

5. The method according to claim 1, further comprising:
   sending, by the data collection device, to the data analysis device based on a data reporting periodicity, performance indicator data collected at an end moment of each data reporting periodicity, wherein the duration of the first change detection window is less than duration of the data reporting periodicity.

6. A data collection method, comprising:
   sending, by a data analysis device, a first configuration message to a data collection device, wherein the first configuration message comprises a duration of a first change detection window and a change detection threshold, the duration of the first change detection window and the change detection threshold are used by the data collection device to detect a value relationship between the change detection threshold and a change amplitude of performance indicator data of a target device within the first change detection window; and
   receiving performance indicator data that is sent by the data collection device, that is within the first change detection window, and that exceeds the change detection threshold and removed sent performance indicator data that has been sent from the first change detection window, wherein the sent performance indicator data has been sent in a second change detection window, and the first change detection window is slid based on the second change detection window.

7. The method according to claim 6, wherein the performance indicator data is at least one of a transmit optical power, a receive optical power, a bias current, a voltage, or a temperature.

8. The method according to claim 6, wherein the data analysis device determines the duration of the first change detection window based on a performance indicator corresponding to the performance indicator data and a collection periodicity of the performance indicator; and/or the data analysis device determines the change detection threshold based on the performance indicator corresponding to the performance indicator data and collection precision of the performance indicator.

9. The method according to claim 6, wherein before sending the first configuration message to the data collection device, the method further comprises:
receiving collection capability information sent by the data collection device, wherein
the collection capability information of the collection device comprises: a performance indicator corresponding to the performance indicator data, and a collection periodicity and collection precision of the performance indicator.

10. The method according to claim 6, further comprising:
receiving data processing capability information sent by the data collection device, wherein
the data processing capability information comprises a sequence compression algorithm, and the sequence compression algorithm is used by the data collection device to compress the sent performance indicator data.

11. A data collection device, comprising:
at least one processor; and
one or more memories coupled to the at least one processor and storing instructions, which when executed by the at least one processor, cause the data collection device to:
collect performance indicator data of a target device based on a first collection periodicity including receiving a first configuration message sent by a data analysis device, wherein the first configuration message comprises a duration of a first change detection window and a change detection threshold;
detect a change amplitude of the collected performance indicator data that is within the first change detection window by detecting a value relationship between a change detection threshold and a difference between a maximum value and a minimum value of collected key performance indicator data that is in the first change detection window, wherein the first change detection window comprises multiple collection periodicities; and
in response to detecting that the change amplitude of the performance indicator data within the first change detection window is greater than or equal to the change detection threshold, send the performance indicator data that is within the first change detection window to a data analysis device;
wherein to send the performance indicator data that is in the first change detection window to the data analysis device comprises:
remove, by the data collection device, sent performance indicator data that has been sent and is in the first change detection window, and send remaining performance indicator data that is in the first change detection window to the data analysis device, wherein the sent performance indicator data has been sent in a second change detection window, and the first change detection window is slid based on the second change detection window.

12. The data collection device according to claim 11, wherein the performance indicator data is at least one of a transmit optical power, a receive optical power, a bias current, a voltage, or a temperature.

13. The data collection device according to claim 11, wherein
the instructions when executed by the at least one processor further cause the data collection device to send collection capability information to the data analysis device, wherein
the collection capability information of the data collection device comprises: a performance indicator corresponding to the performance indicator data, and a collection periodicity and collection precision of the performance indicator.

14. A data analysis device, comprising:
at least one processor; and
one or more memories coupled to the at least one processor and storing instructions, which when executed by the at least one processor, cause the data analysis device to:
send a first configuration message to a data collection device, wherein the first configuration message comprises a duration of a first change detection window and a change detection threshold, the duration of the first change detection window and the change detection threshold are used by the data collection device to detect a value relationship between the change detection threshold and change amplitude of performance indicator data of a target device in the first change detection window; and
receive the performance indicator data that is sent by the data collection device, that is in the first change detection window, and that exceeds the change detection threshold and removed sent performance indicator data that has been sent from the first change detection window, wherein the sent performance indicator data has been sent in a second change detection window, and the first change detection window is slid based on the second change detection window.

15. The data analysis device according to claim 14, wherein the performance indicator data is at least one of a transmit optical power, a receive optical power, a bias current, a voltage, or a temperature.

16. The data analysis device according to claim 14, wherein the instructions when executed by the at least one processor further cause the data analysis device to:
determine the duration of the first change detection window based on a performance indicator corresponding to the performance indicator data and a collection periodicity of the performance indicator; and
determine the change detection threshold based on the performance indicator corresponding to the performance indicator data and collection precision of the performance indicator.

* * * * *